United States Patent [19]

van Walraven

[11] Patent Number: 5,056,196
[45] Date of Patent: Oct. 15, 1991

[54] PIPE-CLIP

[75] Inventor: Jan van Walraven, Mijdrecht, Netherlands

[73] Assignee: J. van Walraven B.V., Mijdrecht, Netherlands

[21] Appl. No.: 492,638

[22] Filed: Mar. 13, 1990

[30] Foreign Application Priority Data

Mar. 14, 1989 [NL] Netherlands ................. 8900619

[51] Int. Cl.⁵ .......................................... A44B 1/04
[52] U.S. Cl. ................................. 24/279; 403/344
[58] Field of Search .................. 403/344; 24/279, 280

[56] References Cited

U.S. PATENT DOCUMENTS 1,373,673  4/1921  Ritter ................................. 24/279
2,002,141  5/1935  Dumke ........................... 24/279 X
3,298,717  1/1967  Rothwell et al. ............... 24/279 X

FOREIGN PATENT DOCUMENTS 0188649  7/1986  European Pat. Off. .
3346423  8/1984  Fed. Rep. of Germany .
8806714  8/1988  Fed. Rep. of Germany .

Primary Examiner—Andrew V. Kundrat
Attorney, Agent, or Firm—Frishauf, Holtz, Goodman & Woodward

[57] ABSTRACT

A pipe-clip, comprising an annular clip body formed from a flexible strip, the ends of which are provided with flanges adapted to be pulled together by means of a fastening screw and nut, in which one of the flanges has an outwardly opening slot adapted to laterally receive the shank of the fastening screw. According to the invention the nut is incorporated in an auxillary part that normally bears on that side of the second flange which is turned away from the first flange, said auxiliary part being fastened in such a way, that it may resiliently bend away from said second flange through a certain angle about an axis located adjacent the transition between the annular clip body and said flange, said second flange having a slot-shaped passage opening allowing an outward tilting movement of the fastening screw. When applying the annular clip body around a pipe of similar article-causing the two flanges to move one towards the other — the screw provisionally threaded into the nut in the auxiliary part carried by the second flange will first — due to tbe first flange pressing against the head of the screw — tilt outwardly and then tilt back under spring action so that its shank is entering into the slot.

7 Claims, 3 Drawing Sheets

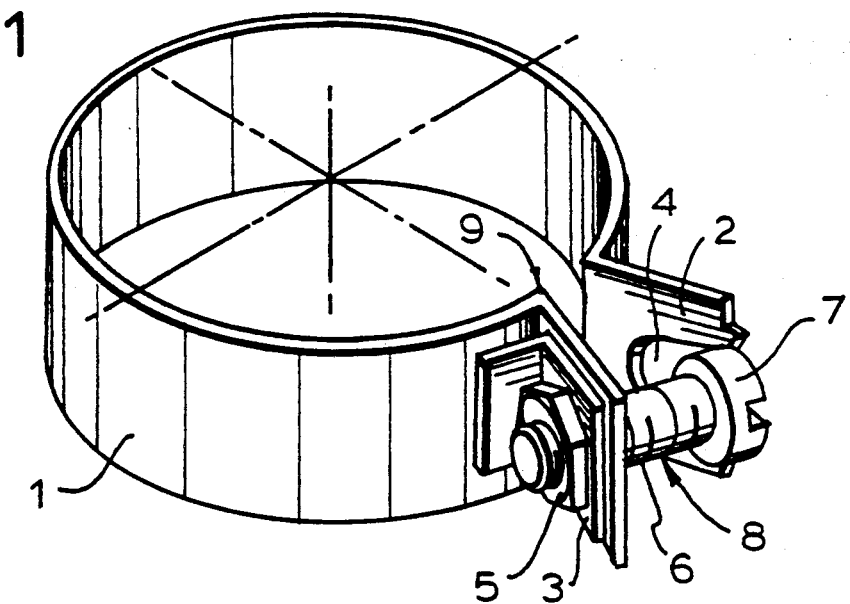
FIG. 1
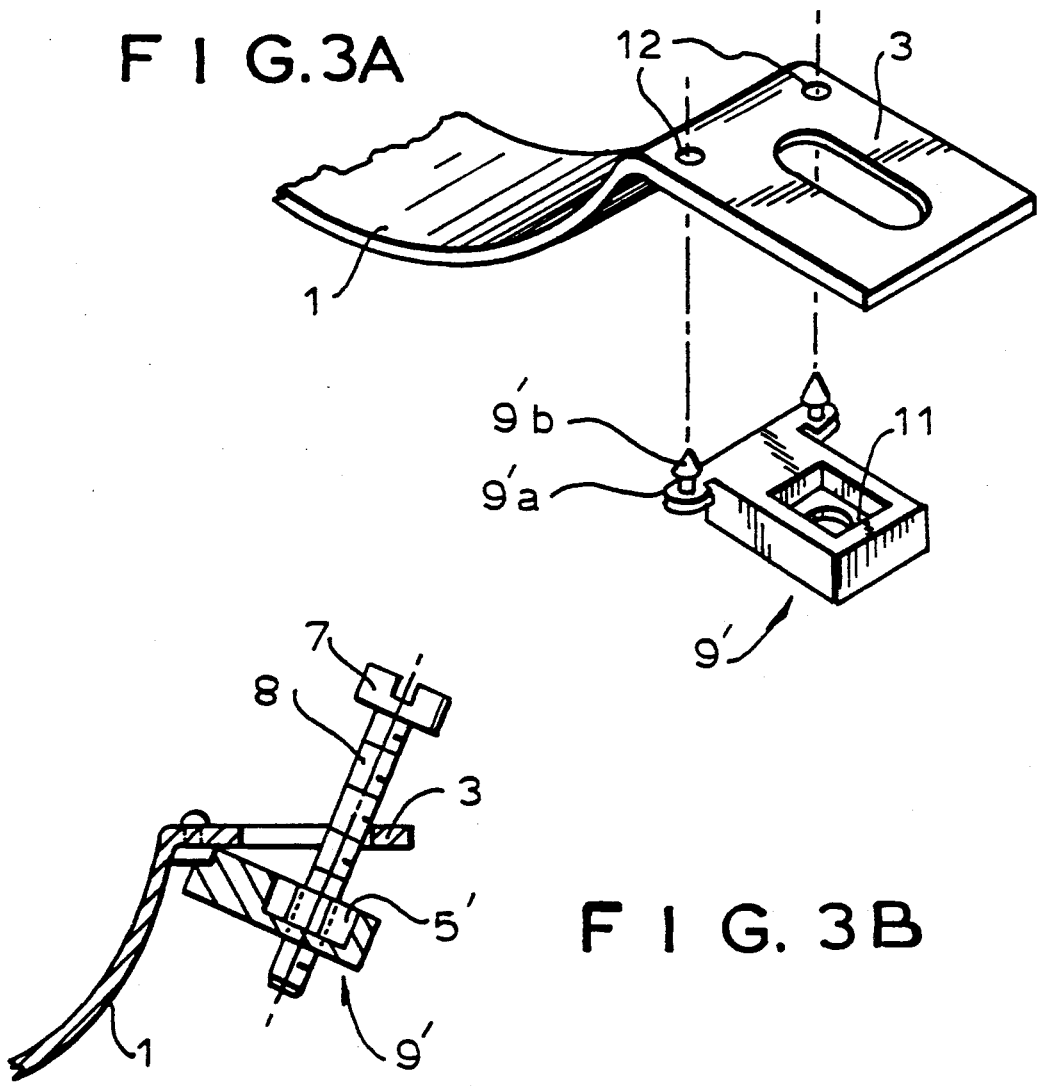
FIG. 3A
FIG. 3B

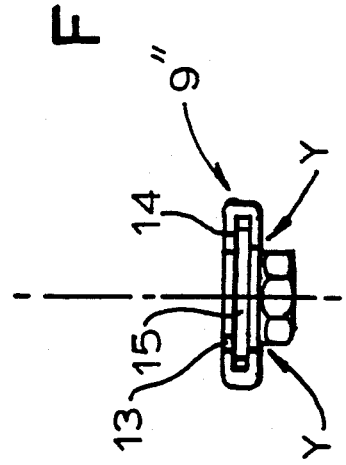
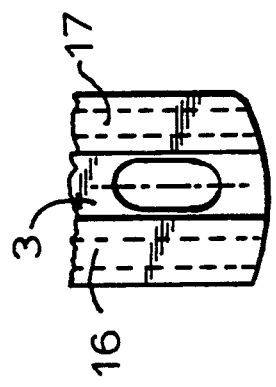
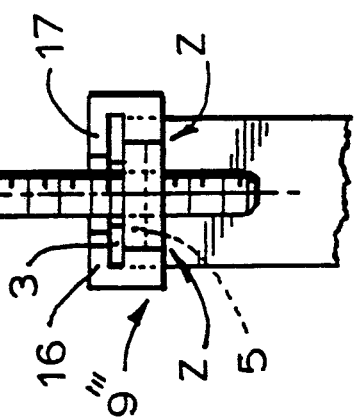
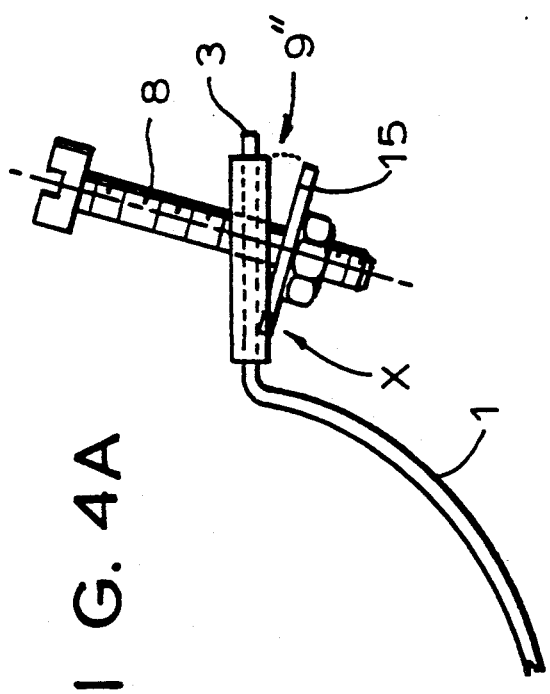
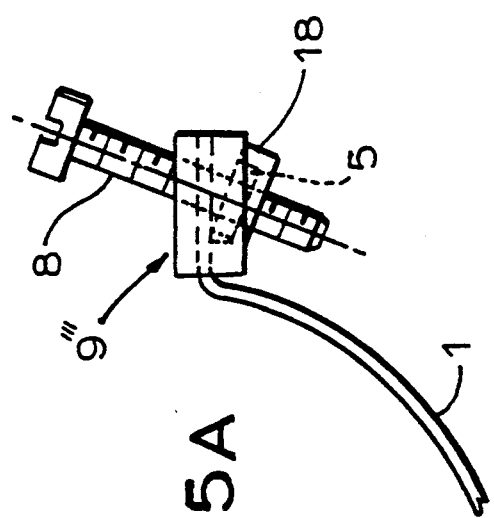

PIPE-CLIP

The invention relates to a pipe-clip, comprising an annular clip body formed from a flexible strip, the ends of which are provided with flanges adapted to be pulled together by means of a fastening screw and nut, in which one of the flanges, which is integrally formed with said annular clip body, has an outwardly opening slot adapted to laterally receive the shank of the fastening screw whereas the other flange comprises the nut, in such a way, that, when applying the annular clip body around a pipe or similar article—causing the two flanges to move one towards the other—the screw provisorily threaded into the nut carried by the second flange will first—due to the first flange pressing against the head of the screw—tilt outwardly and then tilt back under spring action so that its shank is entering into the slot.

Such a pipe-clip is known from DE-A-34 39 418.

With this well-known pipe-clip the second flange, which is integrally formed with the nut, is formed as a separate part, having a lip extending substantially under a right angle through a slot at the respective end of the annular clip body and thus having a sort of hook connection with the clip body. The annular clip body has on its inner side a resilient lining of rubber, which pushes the projecting lip of the flange against the inner side of the annular clip body and thus holds the second flange in its normal position (i.e. radially relative to the annular clip body). When applying this well-known clip around a pipe or similar article to be fastened, the lip may, in the initial phase when the annular clip body has a rather large clearance relative to the pipe yet—turn inwardly against the pressure of the rubber lining so that the flange is permitted to perform a certain pivoting movement relative to the annular clip body so as to allow the required tilting movement of the fastening screw to take place. As soon as the head of the screw will have passed the terminal edge of said first flange, the elasticity of the rubber lining causes the lip and thereby the second flange to return into its initial position, whereby the shank of the fastening screw will "snap" into the slot of said first flange.

The advantage of a pipe clip of this type is to be seen in that it may be applied around the pipe to be fastened in a simple manner, whereby the pre-mounted fastening screw will automatically get into the fastening position.

Due to the second flange carrying the fastening screw being formed as a separate part, however, the well-known pipe-clip is of a rather complicated construction and hence rather expensive, while the correct functioning of it is dependent on the use of a lining acting as a spring.

A simpler construction of such a pipe clip, which is just as easy to handle and which functions in a reliable manner with and without a lining, is disclosed in not pre-published Dutch patent application 8801393. With the latter clip the second flange is also formed in one piece with the annular clip body and the construction is designed so that said second flange may perform a pivoting movement relative to the clip body under spring action. In this embodiment, however, the use of a thin strip of spring steel is required.

The present invention aims at providing a pipe-clip of the type above referred to, which does not have the disadvantages of the well-known pipe-clip described hereinabove and the functioning of which is not dependent on the spring action of the material of which the clip body is formed, as is the case in the embodiment according to said not-prepublished Dutch patent application.

The pipe-clip proposed by the present invention is characterized in that the nut is incorporated in an angle bracket piece that normally bears on that side of the second flange turned away from the first flange, said second flange being integrally formed with the annular clip body, said angle bracket piece being fastened in such a way, that it may resiliently bend away from said second flange through a certain angle about an axis located adjacent the transition between the annular clip body and said flange, said second flange having a slot-shaped passage opening allowing an outward tilting movement of the fastening screw.

In a simple and practical embodiment of the invention the angle bracket piece is formed by a leaf spring carrying the nut a bent portion at one end of said spring being fastened to the annular clip body at a location adjacent the respective flange. This embodiment is suitable for a permanent fastening of the auxiliary part of the (metallic) clip body, e.g. by spot welding.

In a preferred embodiment the auxiliary part is formed by a thin piece of plastic material, provided with a recess for accomodating the fastening nut, the latter becoming enclosed between the bottom of said recess and the second flange. Such a piece of plastic material may be fastened in various ways allowing it to be turned away in a resilient manner from said second flange.

The invention will be hereinafter further explained with reference to the drawings, in which four embodiments of the invention are shown.

FIG. 1 is a perspective view of the pipe-clip according to the invention in a first embodiment;

FIG. 2A–C show a cross-sectional view of the pipe-clip according to FIG. 1 in three successive stages of closing the annular clip body around the article to be fastened;

FIG. 3A and 3B show a perspective view and a cross-sectional view respectively of a part of the clip body including the second flange, whereby an auxiliary part of plastics material is used;

FIG. 4A and 4B show a side elevation and front elevation respectively of a modification of the auxiliary part of FIG. 1 and 2A–C and FIG. 5A–C show side-, front- and plan views of a modification of the auxiliary part of FIG. 3A–B.

Figure 2C:
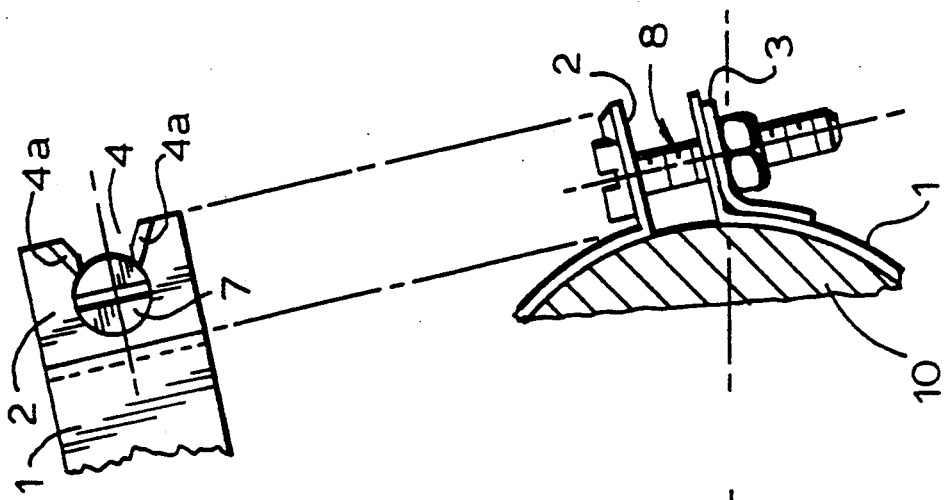

The pipe-clip shown in FIG. 1 and 2 has an integrally formed annular clip body 1 that is made of a metallic strip. The ends of the annular clip body 1 are bent to form a first and a second flange 2 and 3 respectively. The first flange 2 is provided with a radial slot emanating from the terminal edge of said flange, while the second flange 3 is provided with a corresponding slot-shaped opening (not further shown) for accomodating the threaded shank 6 of a fastening screw 8, the head of which is indicated at 7.

The nut 5 which cooperates with the screw 8, is fastened, e.g. by welding, to an auxiliary part 9 formed by a leaf spring, which part normally (FIG. 1 and FIG. 2A–B) bears onto that side of the flange 3 which faces away from said flange 2 and which as an end portion 9a bent at substantially right angles that is attached, e.g. by spot welding, to the clip body 1 at a location adjacent the flange 3.

Figure 2B:
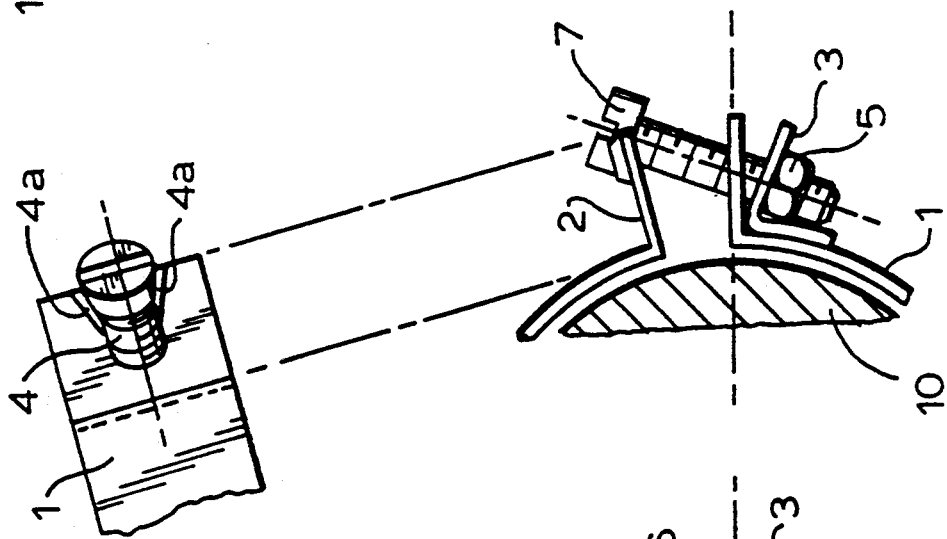
Figure 2A:
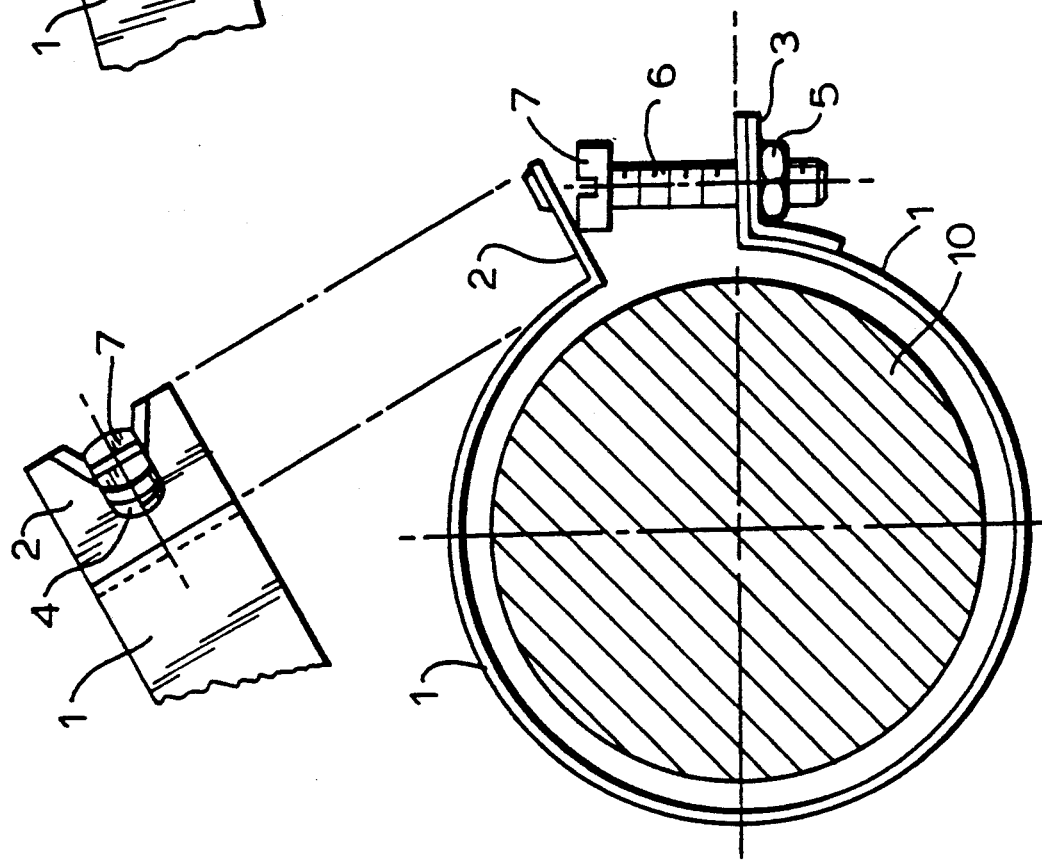

FIG. 2A shows the pipe-clip in a position around the article 10 (e.g. a pipe) to be fastened, in a stage, in which the first flange 2 abuts to the head 7 of the clamping screw that has been provisorily screwed into the nut 5 via the slot shaped opening in the second flange 3.

FIG. 2B shows how the clamping screw 8 is tilting outwardly when the flanges 2 and 3 are moved towards one another. It is clearly shown that the angle bracket piece 9 has turned away (against spring action) from the flange 3. This tilting movement may be enlightened by having the screw head 7 guided by the outwardly bent and slightly diverging longitudinal edges 4a of the slot 4. As soon as in this way the clamping screw head 7 has reached the side of the flange 2 turned away from the flange 3, the clamping screw 8 will snap with its shank 6 into the slot 4 as a result of the angle bracket piece 9 being then allowed to return to its position shown in FIG. 2A.

At last FIG. 2C shows the pipe-clip in the position, in which the annular clip body 1 has been clamped around the article 10 by tightening the clamping screw 8.

In the preferred embodiment according to FIG. 3A-B the angle bracket piece 9' consists of a thin piece of plastics material, provided with a recess 11 for accommodating the (e.g.) square nut 5' (FIG. 5B). One end of the auxiliary part 9' of plastics material is provided with integrally formed lips 9'a having projecting fastening studs 9'b, which fit in corresponding holes 12 in the second flange 3 adjacent the transition to the clip body 1. It will be understood that upon assembling of the separate parts shown in FIG. 3A the auxiliary part 9' will bear onto the lower side of the flange 3. It is shown in FIG. 3B, how a clamping screw 8 provisorily screwed into the nut 5' sunk into the auxiliary part 9', may tilt outwardly by bending the angle bracket piece 9' downwardly about a bending line through the fastening studs 9'b.

In the embodiment of FIG. 4A-B the angle bracket piece 9" formed of a strip of spring steel has its longitudinal edges 13, 14 bent in such a way, that it may be slided onto the second flange 3, whereby the longitudinal edges 13, 14 engage those of the flange 3. The so formed auxiliary part 9" is provided with two parallel cuts Y, which start from one end of the angle bracket piece and terminate at a short distance (at X) from the other end. In this manner a resilient tongue 15 is provided, that carries the nut 5. FIG. 4A shows this tongue in its, against spring action, outwardly bent position corresponding to the tilted position of the screw 8.

In the embodiment of FIG. 5A-C, showing a modification of the auxiliary part of FIG. 3A, B the auxiliary part 9''' formed of plastics material is provided with two integrally formed longitudinal edges 16, 17 facing one towards the other. These longitudinal edges may, in a similar way as described in connection with the embodiment according to FIG. 4A, B, engage the longitudinal edges of the second flange 3. Also two cuts Z are provided, due to which a tongue 18 is formed, which comprises the recess containing the nut 5 and which may bend in the manner shown in FIG. 5A so as to permit the screw 8 to tilt outwardly.

I claim:

1. A pipe-clip comprising an annular clip body formed from a flexible strip having its ends integrally made of a flexible strip having its ends integrally formed into outward flanges, of which a first flange has an outwardly open slot of a shape and size for receiving, through its open end, the shank of a fastening screw and a second flange has an aperture of a size and shape for allowing passage of said screw at any of a predetermined variety of distances from the place where said second flange joins the remainder of said clip body, and further comprising:

an angle bracket nut-holding piece made of resilient material of a configuration having first and second wings integrally joined together to form a corner at least approximately fitting, when said clip body is not under tension, in the corner formed by said second flange and the portion of said clip body extending away from said second flange, said first wing of said angle bracket piece being in sheet form shaped for fitting on the outside of a portion of said annular clip body near said second flange thereof and being firmly attached to said portion of said clip body at least at a portion of said first wing which is spaced away from said corner by said annular clip body, said second wing of said angle bracket piece having an outer contour of about the size and shape of said second flange of said clip body, also having means for holding a nut facing said aperture of said second flange, at least when said clip body is not under tension and said second wing is accordingly close to said second flange, said second wing further having aperture means for facilitating the passage of said shank of said screw through said nut when said screw is screwed into said nut, the resilience of said angular bracket piece being sufficient so that when said screw shank is already screwed into said nut held in said second wing, said second wing of said bracket piece can be swung, by manipulation of said screw, back away from said second flange over an angle sufficient for enabling a portion adjacent to a head of said screw to be swung outward of said first flange and then inserted into the open end of said slot thereof, and the force of said resilience of said angle bracket then being effective, as the screw is further tightened, to propel the head of said screw towards the bottom of said open slot.

2. The pipe-clip of claim 1, wherein said angle bracket piece is made of a leaf spring having a nut affixed in said second wing portion and being bent to provide said second wing portion, said second wing portion being affixed to said annular clip body.

3. The pipe-clip of claim 1, wherein said angle bracket piece consists of a thin piece of plastic material shaped to provide a recess for accommodating said nut and holding it enclosed between the bottom of said recess and said second flange at least in the normal position of said angle bracket piece.

4. The pipe-clip of claim 3, wherein said first wing of said angle bracket piece is provided with integrally formed lips having projecting fastening studs which fit into corresponding holes in the second flange adjacent to its junction with the remainder of said clip body.

5. The pipe-clip of claim 3, wherein said angle bracket piece is provided with two integrally formed longitudinal edges facing each other which engage the longitudinal edges of said second flange and with cuts starting from one end of said angle bracket piece being provided to form a resilient tongue which comprises said recess for holding said nut.

6. The pipe-clip of claim 3, wherein the angular relation to said first and second wings of said angle bracket is such that said first wing of said angle bracket bears against said second flange of said clip body in the absence of the exertion of force on said screw to tilt the head of said screw away from said clip body.

7. A pipe-clip comprising an annular clip body made of a flexible strip having its ends integrally formed into outward flanges, of which a first flange has an outwardly open slot of a shape and size for receiving, through its open end, the shank of a fastening screw and a second flange has an aperture of a size and shape for allowing for passage of said screw at any of a predetermined variety of distances from the place where said second flange joins the remainder of said clip body, and further comprising:

an angle bracket nut-holding piece formed of a strip of spring steel, having first and second wings integrally joined together to form a corner at least approximately fitting, when said clip body is not under tension, in the corner formed by said second flange and the portion of said clip body extending away from said second flange, said first wing having its longitudinal edges bent so that it may be slid onto said second flange, said first wing of said angle bracket having two parallel cuts that start at the end of said wing which continue into said second wing and terminate at a short distance from the end thereof, thereby forming a resilient tongue, a nut being affixed to said tongue at a location providing an aperture of said tongue for passage of said screw when said screw is screwed into said nut, said first wing being shaped relative to said second wing for bearing against said clip body when said second wing is slid onto said second flange as far as it can go, the resilience of said tongue of said angle bracket piece being sufficient so that when said screw is already screwed into said nut, said tongue can be swung by manipulation of said screw, back away from said second flange over an angle sufficient for enabling a head portion of said screw to be swung outwardly of said first flange of said clip body and engaged in the entrance to said open slot of said first flange, the stored force of resilience of said tongue then being sufficient to facilitate the swinging of said screw to the bottom of said open slot when said screw is thereafter screwed further into said nut.

* * * * *